United States Patent
Hihath et al.

(10) Patent No.: US 11,640,014 B2
(45) Date of Patent: May 2, 2023

(54) HIGH FREQUENCY HYBRID PHONONIC METAMATERIALS FOR OPTICAL AND ELECTRICAL DEVICES

(71) Applicant: THE REGENTS OF THE UNIVERSITY OF CALIFORNIA, Oakland, CA (US)

(72) Inventors: Joshua Hihath, Woodland, CA (US); Omeed Momeni, Davis, CA (US); Davide Donadio, Davis, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 136 days.

(21) Appl. No.: 17/034,091

(22) Filed: Sep. 28, 2020

(65) Prior Publication Data

US 2021/0088693 A1 Mar. 25, 2021

Related U.S. Application Data

(63) Continuation of application No. PCT/US2019/025048, filed on Mar. 29, 2019.

(60) Provisional application No. 62/649,632, filed on Mar. 29, 2018.

(51) Int. Cl.
*G02B 1/00* (2006.01)

(52) U.S. Cl.
CPC ........ *G02B 1/005* (2013.01); *G02B 2207/101* (2013.01)

(58) Field of Classification Search
CPC ........ G02B 5/008; G02B 1/002; G02B 1/007; G02B 26/06; G02B 1/005; G02F 1/292; G02F 2202/30
See application file for complete search history.

(56) References Cited

U.S. PATENT DOCUMENTS

| | | | |
|---|---|---|---|
| 2008/0038830 A1* | 2/2008 | Ure | G01N 33/54353 428/323 |
| 2013/0025961 A1* | 1/2013 | Koh | G10K 11/162 181/207 |
| 2013/0112496 A1* | 5/2013 | Neogi | G10K 11/04 29/609.1 |
| 2014/0113382 A1* | 4/2014 | Taylor | G01N 21/658 436/171 |
| 2018/0340328 A1* | 11/2018 | Koga | G10K 11/172 |

(Continued)

*Primary Examiner* — Jonathan Y Jung
(74) *Attorney, Agent, or Firm* — Park, Vaughan, Fleming & Dowler LLP

(57) ABSTRACT

Various metamaterials are disclosed. An example metamaterial comprises: a first portion with a plurality of nanoparticles; a second portion with a plurality of molecules configured to interlink with the plurality of nanoparticles; and a signal generator configured to provide a signal to the material. The first portion and the second portion of the material are configured to form a hybrid molecule-nanoparticle super-lattice. In some implementations, the first portion of the material is configured to have a mass configured to achieve, at least in part, a designated resonance frequency. The second portion of the material is, in some implementations, configured to have a molecular stiffness configured to achieve, at least in part, the designated resonance frequency. The signal generator is, in some implementations, configured to generate radio frequency (RF) signals.

11 Claims, 10 Drawing Sheets

(56) References Cited

U.S. PATENT DOCUMENTS

2019/0041260 A1\* 2/2019 Zhang ..................... G01J 1/44
2019/0198728 A1\* 6/2019 Tamma ................ H05B 33/145
2022/0333372 A1\* 10/2022 Uchida ................ G10K 11/168

\* cited by examiner

HIGH FREQUENCY HYBRID PHONONIC METAMATERIALS FOR OPTICAL AND ELECTRICAL DEVICES

CROSS-REFERENCE TO RELATED APPLICATIONS

This application claims priority to, and is a 35 U.S.C. § 111(a) continuation of, PCT international application number PCT/US2019/025048 filed on Mar. 29, 2019, incorporated herein by reference in its entirety, which claims priority to, and the benefit of, U.S. provisional patent application Ser. No. 62/649,632, filed Mar. 29, 2018, incorporated herein by reference in its entirety. Priority is claimed to each of the foregoing applications.

The above-referenced PCT international application was published as PCT International Publication No. WO 2019/191719 A1 on Oct. 3, 2019, which publication is incorporated herein by reference in its entirety.

STATEMENT REGARDING FEDERALLY SPONSORED RESEARCH OR DEVELOPMENT

This invention was made with Government support under grant number 1605338 awarded by the National Science Foundation. The Government has certain rights in the invention.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The present disclosure generally related to high frequency hybrid phononic metamaterials and more specifically to high frequency hybrid phononic metamaterials for optical and electrical devices.

2. Background Discussion

Creating metamaterial has been one of the primary focuses for developing materials with desired properties for specific application. Metamaterials are composite materials that provide unique or exotic properties not otherwise exhibited by individual components. Example areas in which metamaterials have proven technically advantageous are optics and phononics.

Technical challenges abound, however. For example, high frequency filters and oscillator circuits use mechanical resonances to absorb or emit electromagnetic energy; these high frequency filters and oscillator circuits use piezoelectric materials that are required to be micro-machined and tuned to achieve a desired frequency response. The resulting frequency produced may be insufficient and additional circuitry is necessary to clean up the response, requiring additional space and higher manufacturing cost.

Metamaterials exhibiting a high quality factor (Q Factor), improving power efficiency and eliminating the need for costly additional circuitry are therefore technically advantageous.

BRIEF SUMMARY

Technologies relating to high frequency hybrid phononic metamaterials for optical and electrical devices are provided.

An example metamaterial comprises: a first portion comprising a plurality of nanoparticles; a second portion comprising a plurality of molecules configured to interlink with the plurality of nanoparticles; and a signal generator configured to provide a signal to the material. The first portion and the second portion of the material are configured to form a hybrid molecule-nanoparticle super-lattice.

In some implementations, the first portion of the material is configured to have a mass configured to achieve, at least in part, a designated resonance frequency.

The second portion of the material is, in some implementations, configured to have a molecular stiffness configured to achieve, at least in part, the designated resonance frequency.

The signal generator is, in some implementations, configured to generate radio frequency (RF) signals.

The signal generator is, in some implementations, an adjustable signal generator configured to adjust the RF signals provided to the first portion and the second portion of the material.

In some implementations, the signal generator is configured to adjust a phononic response of the material.

In some implementations, the adjusting of the signal generator is configured to adjust an electrical signal filtering property of the material.

Methods for making such metamaterials are disclosed. Also disclosed are systems that comprise: one or more processors; memory; and one or more programs, wherein the one or more programs are stored in the memory and configured to be executed by the one or more processors, the one or more programs including instructions for executing the methods for making example metamaterials.

Additionally disclosed are non-transitory computer readable storage mediums storing one or more programs, the one or more programs comprising instructions, which when executed by a computing system with one or more processors, cause the computing system to execute the methods for making example metamaterials.

BRIEF DESCRIPTION OF THE SEVERAL VIEWS OF THE DRAWING(S)

The implementations disclosed herein are illustrated by way of example, and not by way of limitation, in the figures of the accompanying drawings. Like reference numerals refer to corresponding parts throughout the drawings.

DETAILED DESCRIPTION

The present disclosure provides technologies relating to high frequency hybrid phononic metamaterials for optical and electrical devices. An example super-lattice metamaterial may be composed of molecules and nanoparticles and are capable of resonating, in response to optical, plasmonic, electrical, thermal, or mechanical stimulations. These technologies may provide the following technical advantages.

First, by modifying the individual particles, tailored or tunable resonances between 100 MHz to 2 THz may be achieved.

Second, the disclosed technologies use compositional changes, reducing or eliminating the need for micro-machined piezoelectric materials.

Third, such super-lattice metamaterial provides a high quality factor (Q Factor), improving power efficiency and eliminating the need for costly and complex additional circuitry.

Forth, such super-lattice metamaterials have a large number of applications: waveguides, antennas, phononic crystals, frequency separators, optical devices with tuned absorbance characteristics, WiFi, GPS, Bluetooth, and other radio based connectivity, electrical and optical devices, active or passive cooling, THz imaging, and biosensing.

As discussed above, technically advantageous are metamaterials that offer controlled responses to given electrical stimuli, for example, Radio Frequency (RF) signals with frequencies ranging from 00.1 to 100 GHz.

Such metamaterials may have a secondary phonon dispersion relationship that is distinct from the Vibrational Density Of States (VDOS) of each individual component or their balk counterparts. Further controlling the molecular stiffness and the mass of the molecules and nano-particles used in a 2-Dimensional (2D) lattice allows dispersion relationship to be tuned to have resonances at specific energies.

Because of the dipole response of the nano-particles, applying an RF field at a particular frequency capable of exciting a phonon resonance may allow a 2D lattice system to absorb energy at that particular frequency, which in turn may cause a significant increase in impedance at the particular frequency.

To develop such metamaterials, various tools and modelling methods are provided in the present disclosure. With these tools and modelling methods, phonon dispersion relations and electrical response may be measured and studied, so as to tune the behaviors of a 2D hybrid metamaterial system and to build and test the design of electric filters and resonators. Metamaterials providing robust response to structural disorders may achieve high quality factors.

More specifically, to develop hybrid 2D, molecule and nano-particle lattices with qualifies described above, properties of the molecular, nano-particles, and electronic property may be modified, the corresponding frequency responses analyzed in order to understand the relationship between physical components and metamaterial responses.

Figure 1A:
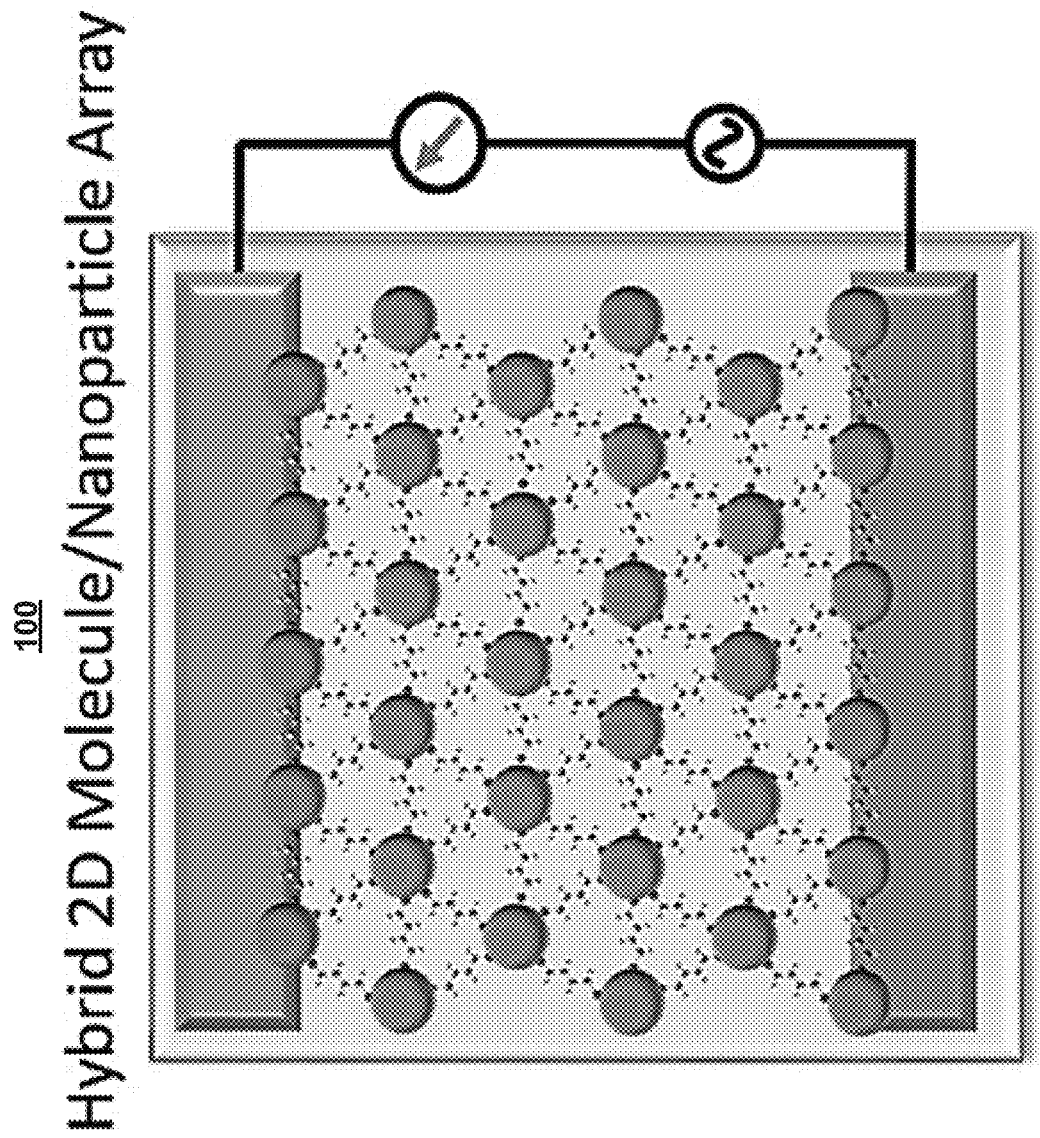
FIG. 1A is a block diagram illustrating example schematic of nanoparticles interlinked with molecules in an on-chip circuit in accordance with some implementations of the present disclosure.

FIG. 1A is a block diagram illustrating example schematic 100 of a 2D lattice having nanoparticles interlinked with molecules in accordance with some implementations of the present disclosure.

Figure 2A:
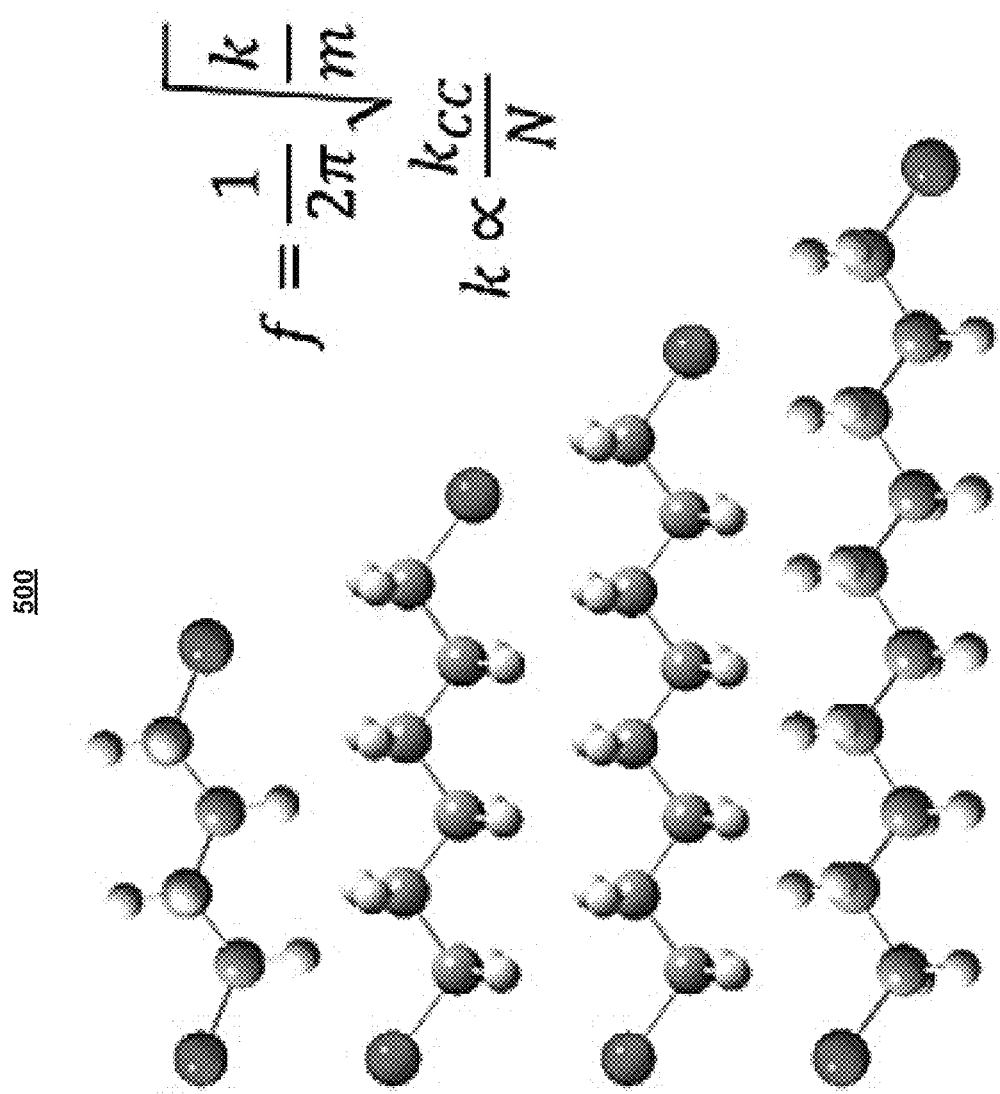
FIG. 2A is a block diagram illustrating example RF responses of 2D hybrid metamaterial in accordance with some implementations of the present disclosure.

As shown in FIG. 1A, in a molecule and nano-particle lattice, nano-particles are analogous to atoms with a conventional mass, while the molecules represent the bonds between the atoms. A second molecule and nano-particle lattice is shown in FIG. 2C.

Figure 1B:
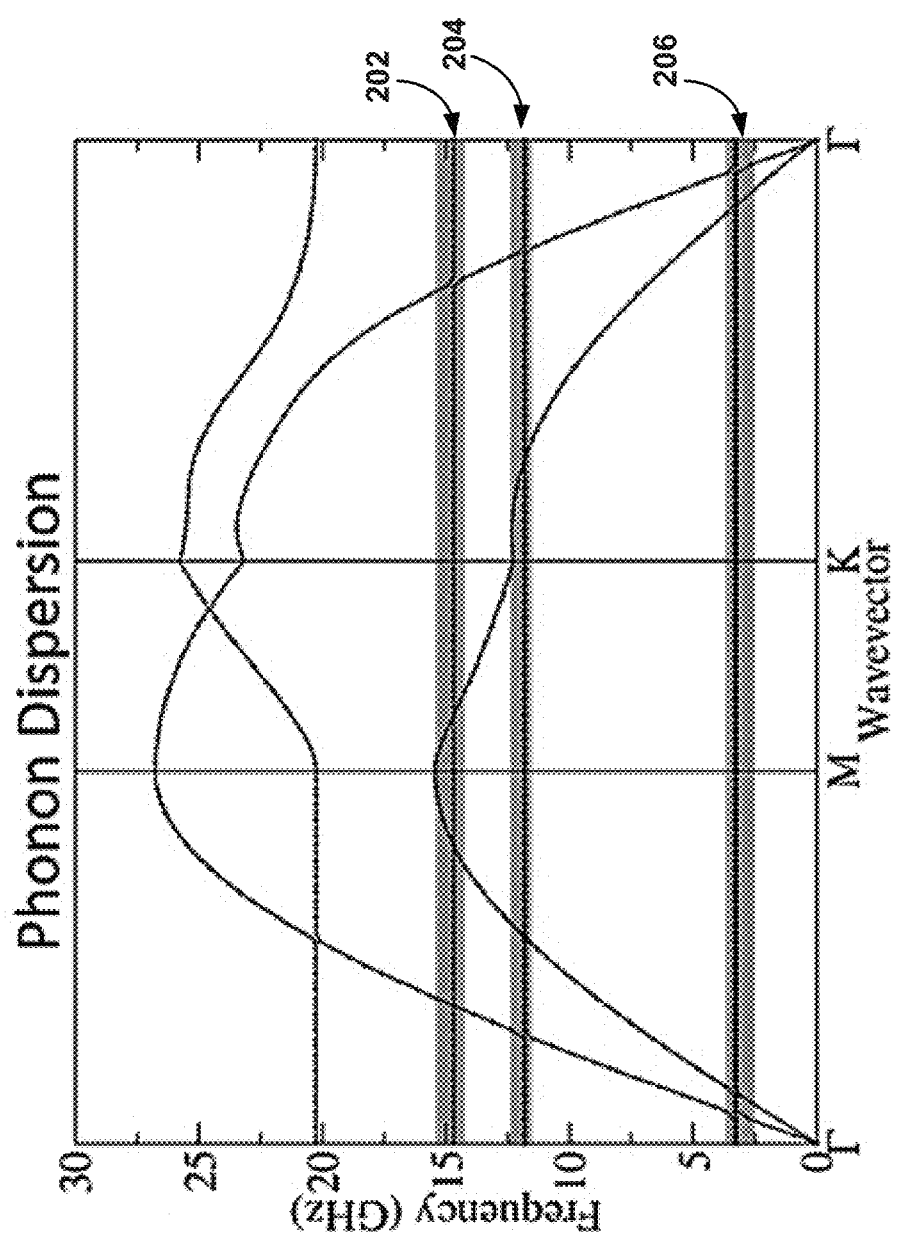
FIG. 1B is a block diagram illustrating example phonon dispersion relationships in accordance with some implementations of the present disclosure.

FIG. 1B is a block diagram illustrating example phonon dispersion relationships in accordance with some implementations of the present disclosure. Vibrational properties, such as those shown in FIG. 1B, are determined by (1) the mass of the nano-particles, (2) the spring constant of the molecules, and (3) the crystal structure of the lattice.

As indicated by the grey strips 202, 204, and 206 shown in FIG. 1B, certain modes in the phonon dispersion relation exist that are independent of crystal direction. These modes in the phonon dispersion relation are of interest, because, in these modes, the positioning of the metamaterial within a transmission line is irrelevant.

Figure 1C:
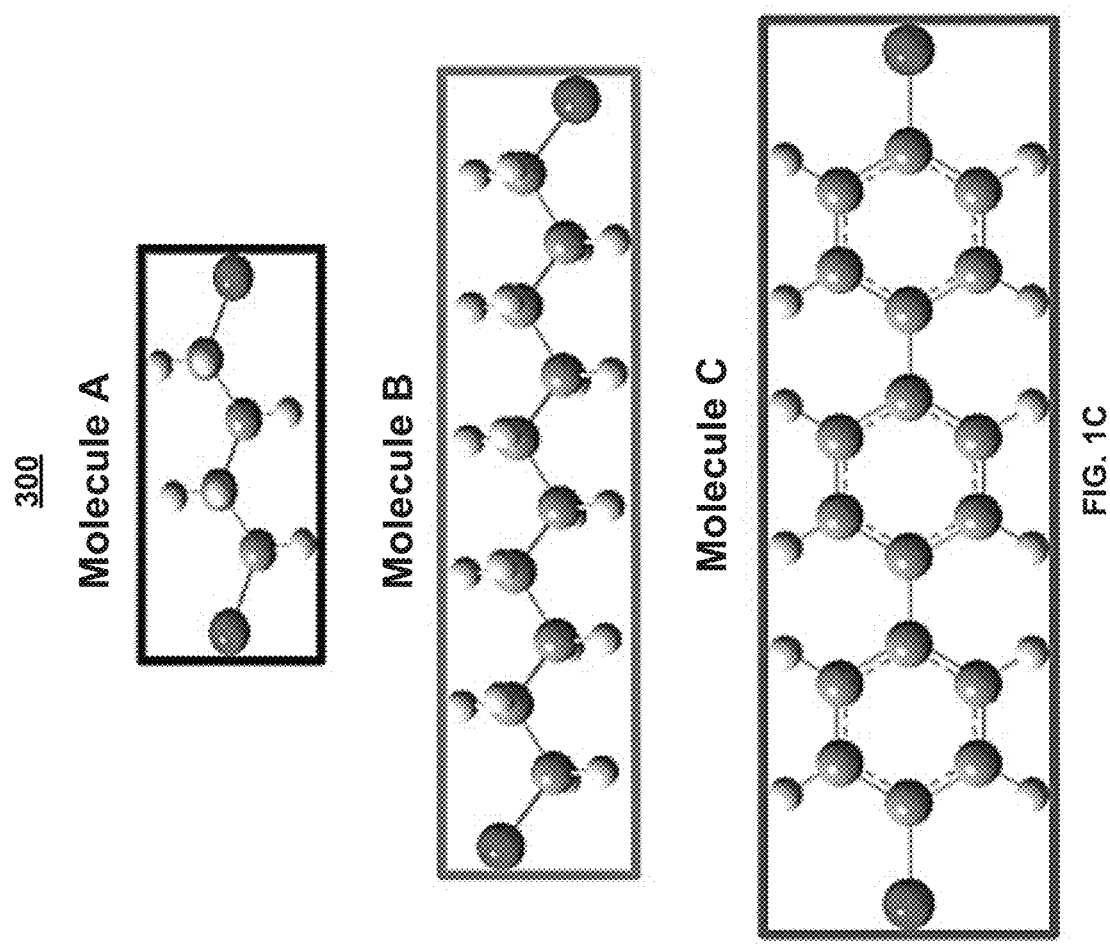
FIG. 1C is a block diagram illustrating example molecules capable of interlinking molecules and modifying phononic response in accordance with some implementations of the present disclosure.

FIG. 1C is a block diagram illustrating example molecules 300 capable of interlinking molecules and modifying phononic response in accordance with some implementations of the present disclosure.

Figure 1D:
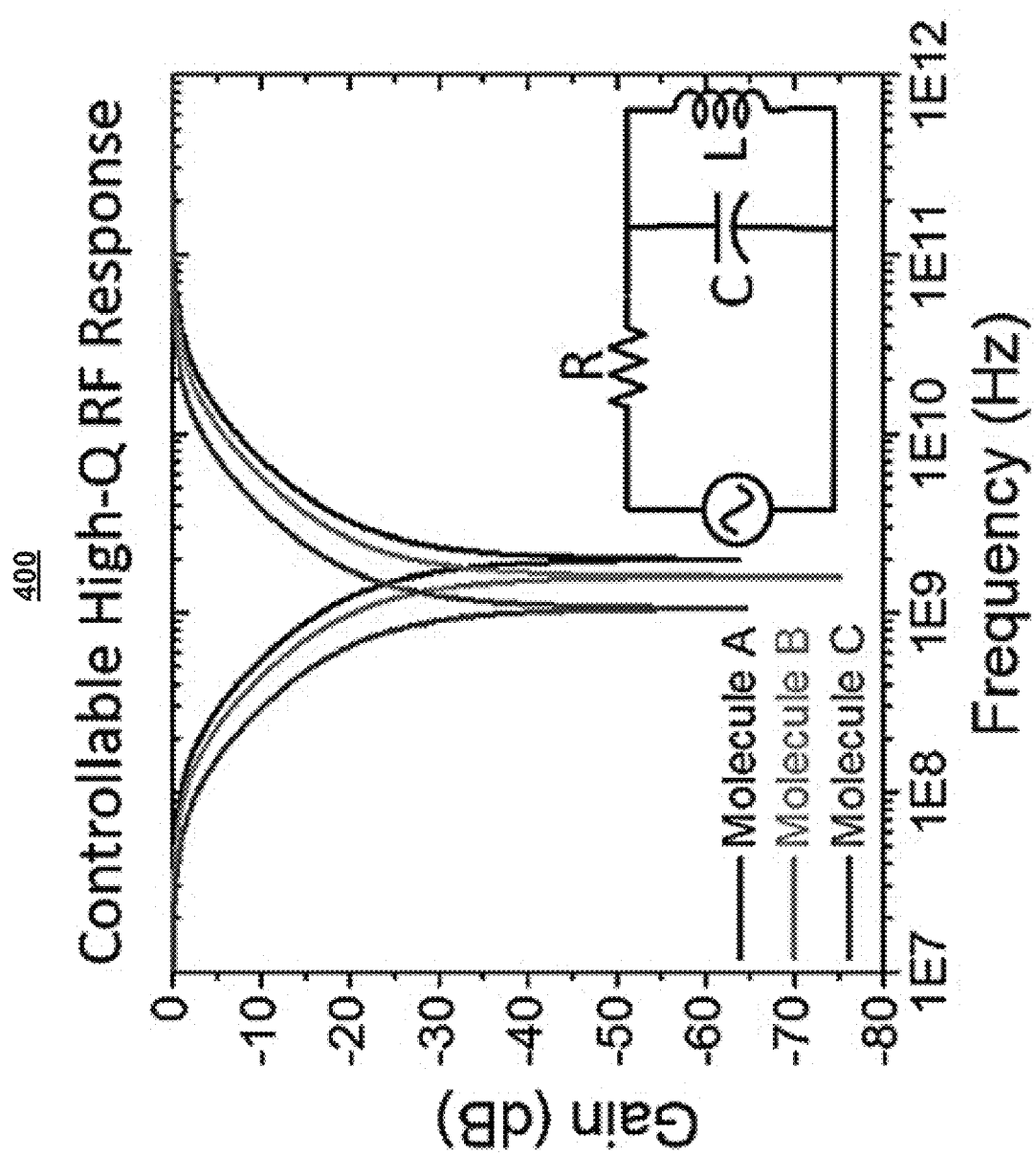
FIG. 1D is a block diagram illustrating example transfer characteristics of a model RLC tank circuit in accordance with some implementations of the present disclosure.

FIG. 1D is a block diagram illustrating example transfer characteristics 400 of a model RLC tank circuit in accordance with some implementations of the present disclosure.

Controlling Molecular Properties

To control the electromagnetic responses of a 2D molecule and nano-particle lattice, molecular stiffness may be changed to modify resonance frequencies. FIG. 2A is a block diagram 500 illustrating example RF responses of 2D hybrid metamaterial in accordance with some implementations of the present disclosure. In FIG. 2A, an example molecular family, the alkanedithiols, is used to tune the spring constant and phonon dispersion relationship of an RF system.

In this example, the molecular spring constant, k, may vary with the total number of carbon atoms in a chain in accordance with $$k \propto K_{cc}/N,$$

where Kcc represents the spring constant of a single carbon-carbon bone, and N represents the total number of bonds in the backbone.

Because the resonance frequency of the 2D molecule and nano-particle lattice depends on this spring constant $$(f \propto \sqrt{k/m}),$$

the primary phonon mode of the 2D molecule and nano-particle lattice may decrease, as the length of the molecular increases.

Figure 2B:
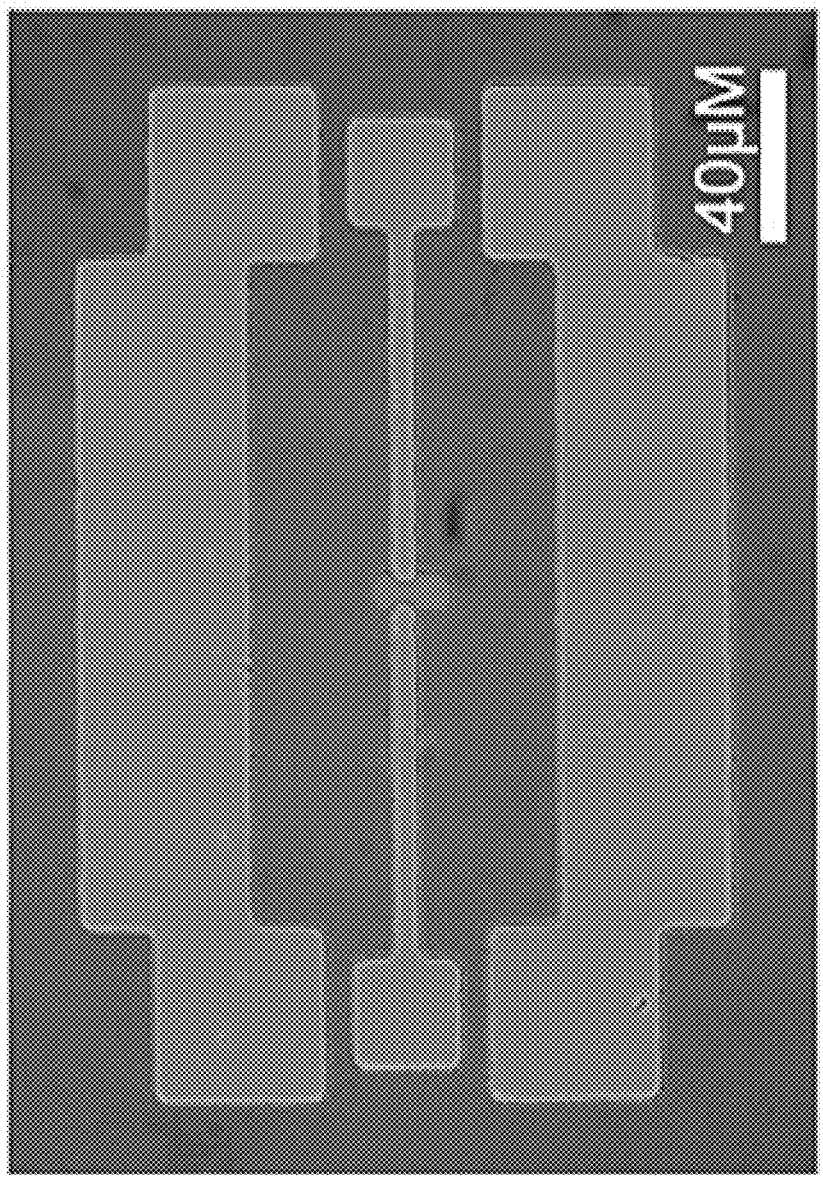
FIG. 2B is a block diagram illustrating an example GSG test structure for measuring RFE circuit responses in accordance with some implementations of the present disclosure.
Figure 2C:
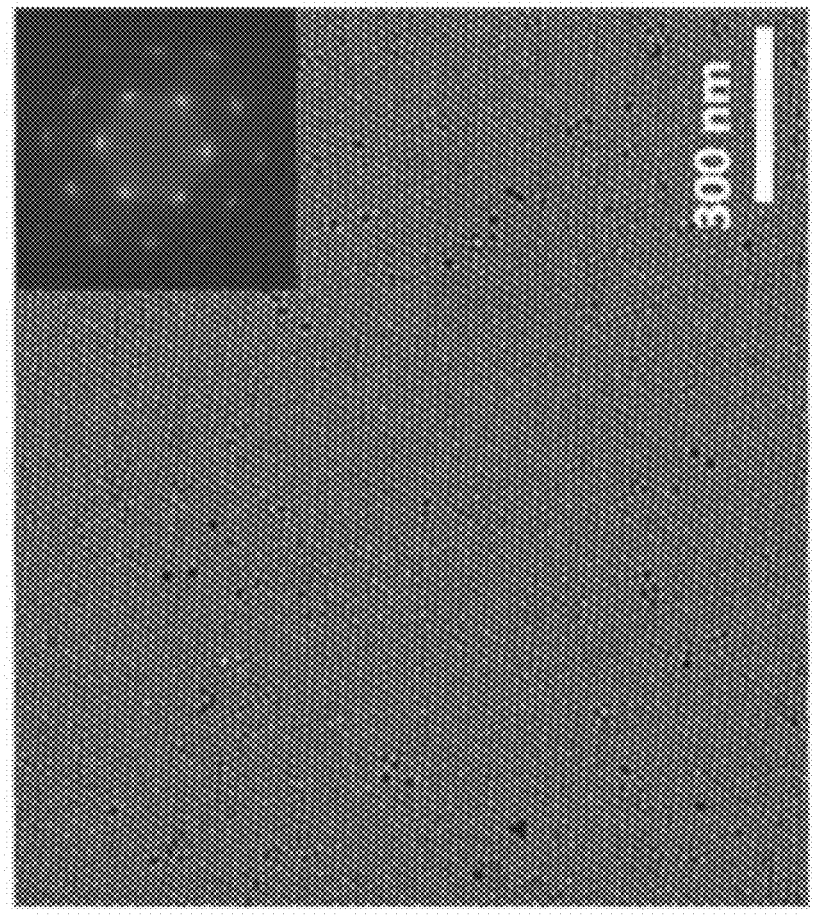
FIG. 2C is a block diagram illustrating an example micrograph of hybrid monolayer with FFT in accordance with some implementations of the present disclosure.

FIG. 2B is a block diagram illustrating an example GSG test structure 600 for measuring RFE circuit responses in accordance with some implementations of the present disclosure. As shown in FIG. 2B, the test structure 600 includes a coplanar transmission line with a 2D molecule and nano-particle monolayer bridging the signal line.

The test structure 600 has been used to demonstrate that the primary phonon mode of the 2D molecule and nano-particle lattice may decrease, as the length of the molecular increases.

FIG. 2C is a block diagram 700 illustrating an example micrograph of hybrid monolayer with FFT in accordance with some implementations of the present disclosure.

Figure 2D:
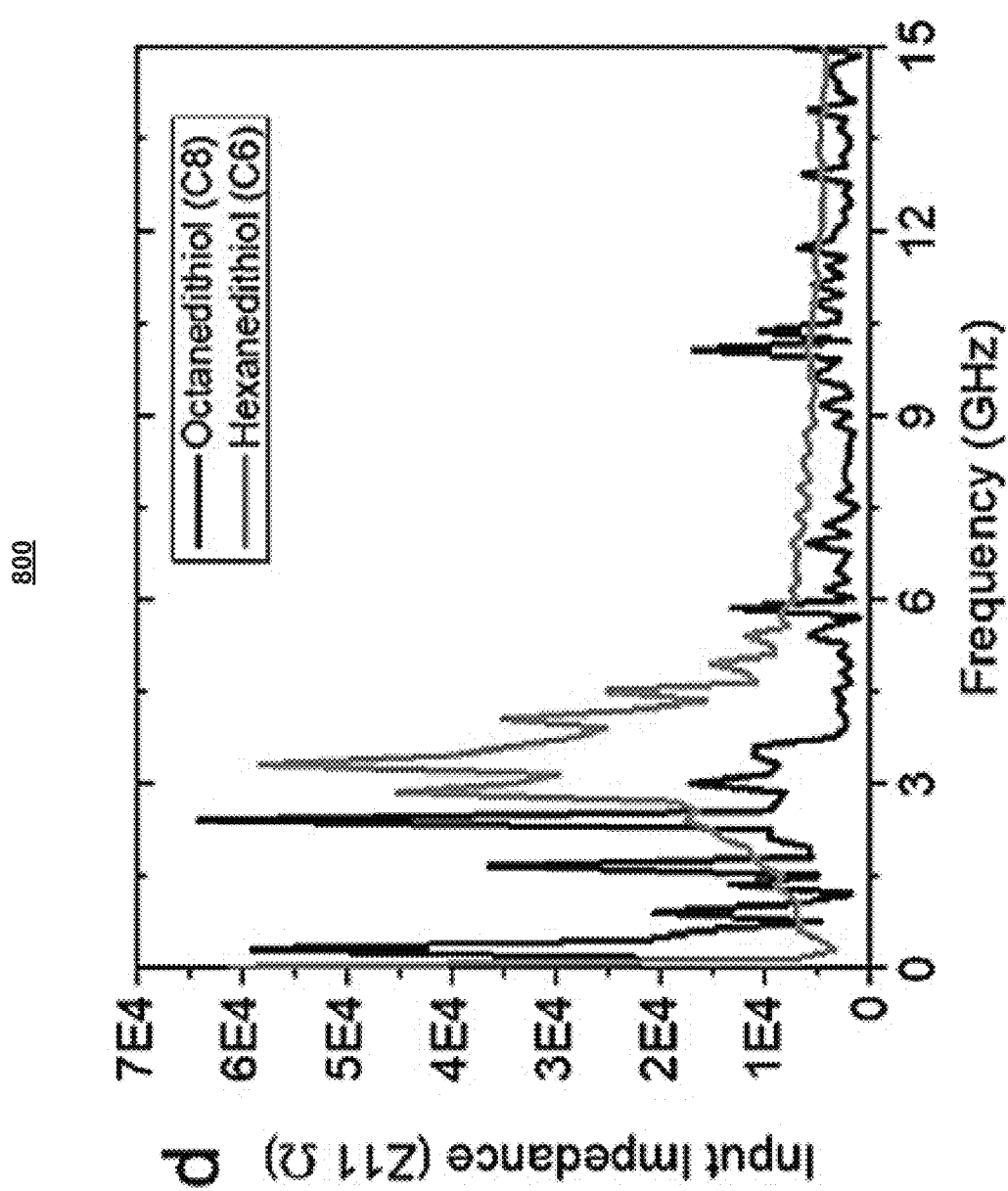
FIG. 2D is a block diagram illustrating example impedances of the GSG test structure shown in FIG. 2B with different molecular linkers in accordance with some implementations of the present disclosure.

FIG. 2D is a block diagram 800 illustrating example impedances of the GSG test structure shown in FIG. 2B with different molecular linkers in accordance with some implementations of the present disclosure.

Controlling Nano-Particle Properties

Besides controlling the properties of a molecular, it may also be desirable to change the properties of a nano-particle, for example, to modify the mass of the nano-particle (also referred to as the atom) in a metamaterial. Decreasing the mass of a nano-particle may increase the resonance frequencies, and enabling frequency responses in approximately the 100 GHz range.

Figure 3A:
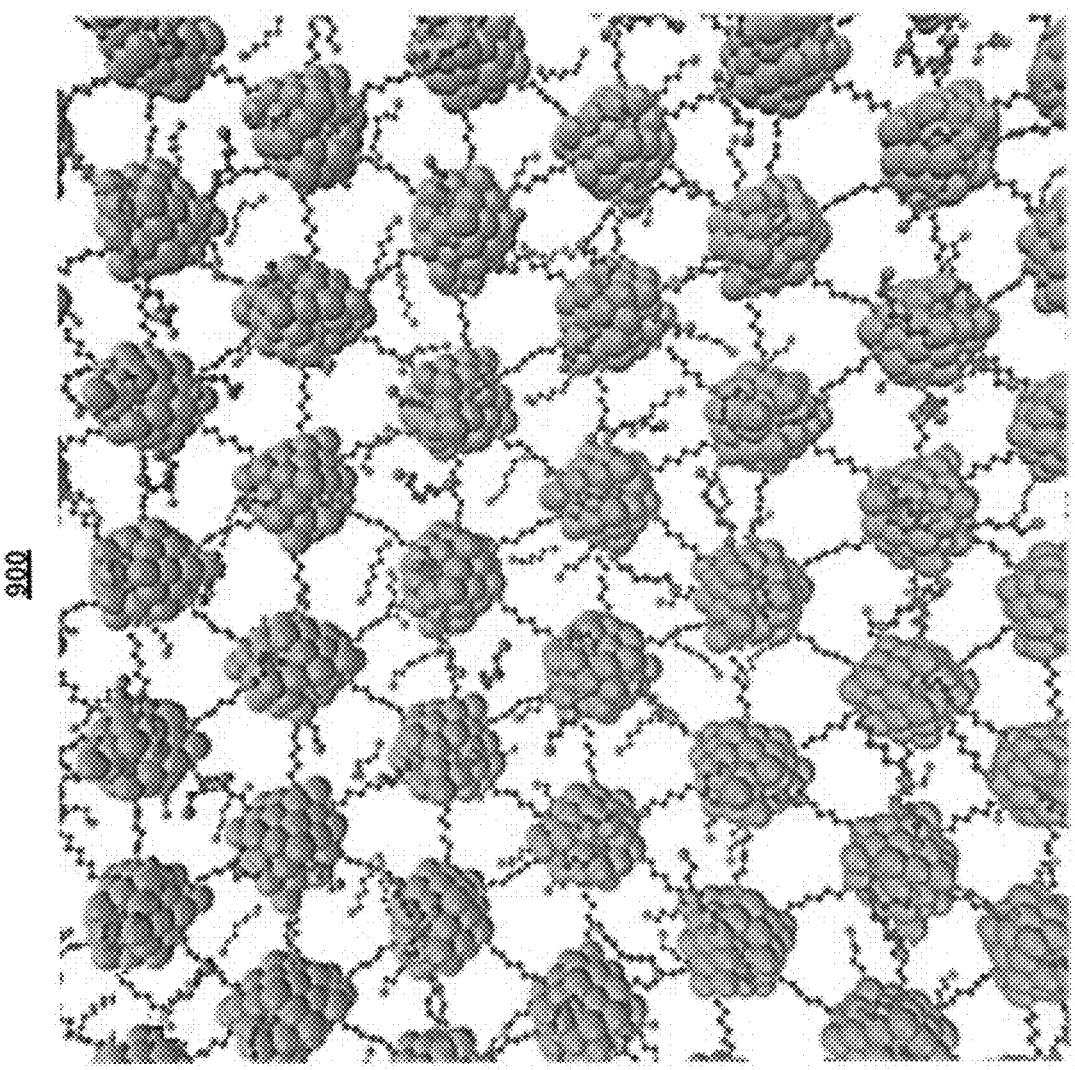
FIG. 3A is a block diagram illustrating an example fully atomistic model of hybrid array made of nanoparticles and hexanedithiol interlinkers in accordance with some implementations of the present disclosure.

FIG. 3A is a block diagram illustrating an example fully atomistic model of hybrid array 900 including nanoparticles and hexanedithiol interlinked together in accordance with some implementations of the present disclosure.

Figure 3B:
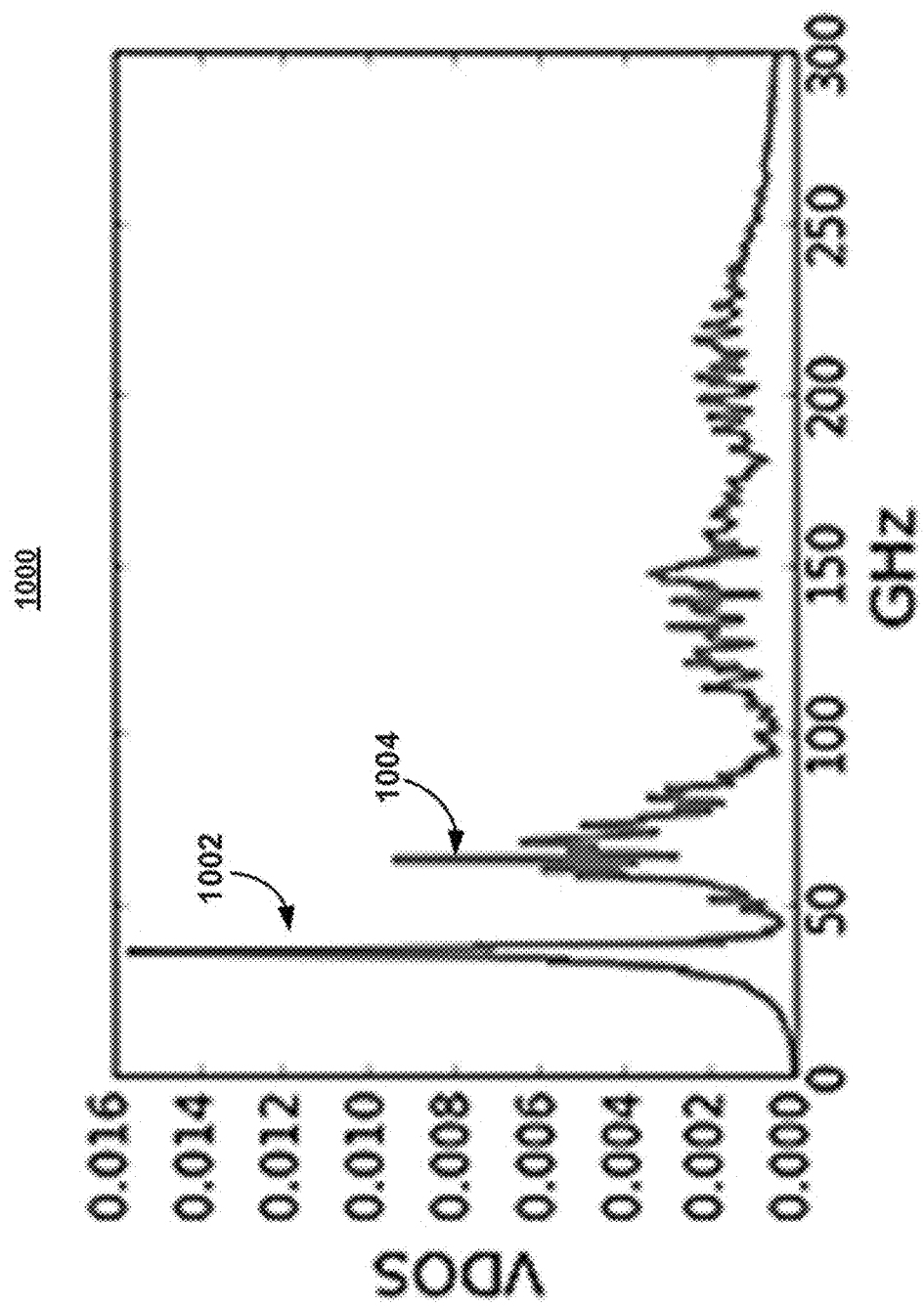
FIG. 3B is a block diagram illustrating example Vibrational density of states in accordance with some implementations of the present disclosure.

FIG. 3B is a block diagram illustrating calculated vibrational density of states 1000 of an array of 1 nm Au nano-particles interlinked with hexanedithiol (C6) molecules, in accordance with some implementations of the present disclosure.

As shown in FIG. 3B, the hybrid array 900 has at least two vibrational modes that may be excited by high frequency stimuli shown in FIG. 2D. The first mode 1002 is located at approximately 35 GHz; the second mode 1004 is located at approximately 70 GHz, indicating that the given metamaterial provides a wide range (e.g., from 35 GHz to 70 GHz) of control over its frequency response.

Controlling Electrical Responses

In addition to controlling molecular properties and nano-particle properties, controlling the electrical properties of the film is also desirable. In order to control the electrical properties of the film, it may be desirable to understand the DC conductivity of the film, the mobility of the firm, and the RF impedance, the mobility of the firm. To understand these properties, the electronic coupling between the nano-particles may be examined first, by using molecular interlinkers that are conjugated and have smaller energy gaps, in order to improve the tunneling probability between the molecular interlinkers. For example, a series of polyphernyl molecules, e.g., the Molecule C shown in FIG. 1C, may be used. These molecules can improve the transport probability between nano-particles and therefore improve the overall conductivity. By examining conductivity of the film, the effects of carrier relaxation on the nano-particles on RF impedance may be determined.

As a second example, carrier density in the film may be modified. By using a substrate as a back gate, the probability of having a carrier on each nano-particle may be modified, thereby changing the hopping probability and the mobility probability. In these ways, effects of impedance mismatch on the phonon resonance properties may be determined and responses may be tuned to optimize impedance matching at any given frequency.

As a third example, the thickness of the films may be modified. For example, the films may have two layers, three layers, and so on. Increasing the total number of layers within a film may (1) increase of number of nearest neighbor for a nano-particle, thereby improving conductivity and (2) impact the phonon dispersion relationships. For example, increasing the total number of layers within a film may decrease the degeneracy of non-dispersive modes, enabling a 2D array to be tuned to provide band-pass filters, instead of band-stop filters.

Modelling of Phononic Properties

Both coarse-grained modeling and atomistic molecular modelling may be used. First, lattice dynamics may be calculated in accordance with coarse-grained models, in which non-particles are represented by single beads with similar mass and similar and connected by harmonic dumbbells that represent molecular linkers. Applying a coarse-grained model may provide a simplified view of a phonon band structure at low frequency with low computational costs. Example results are shown in FIGS. 1A and 1B.

Secondly, Molecular Dynamics (MD) simulations may be performed, for example, to study large-sized systems that include millions of nano-particles and to provide insights into the vibrational properties of hybrid lattices. MD simulations may take into account anharmonicity, disorder on the molecular scale and long range order on mesoscale. A coarse grained representation of nano-particles may be used to match the sizes of the experimental hybrid lattices, while preserving the vibrational features within the GHz range. Equilibrium MD simulations may also be used to compute the phonon band structure of mesoscale materials, through the calculation of the dynamical structure factor; non-equilibrium MD simulations may be used to compute thermal conductance and phonon transmission function of a hybrid array with up to 0.5 um in length.

Models developed for MD simulations may be supplemented by a Drude oscillator model, which enables a hybrid array's responses to an extended electric field to be modelled. Parameters of the polarized model may be obtained by fitting on electronic structure calculations of gold clusters performed at the level of density functional theory.

Circuits may be developed in accordance with data regarding controlling the phonon responses and the electrical characteristics of a hybrid array, and modelling of these data for phononic control. For example, circuit models may be first created to model the electrical responses of a hybrid array. In accordance with these circuit models, notch, band-pass, and frequency separate filters may then be created for RF and mm-wave applications.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first outlet could be termed a second outlet, and, similarly, a second outlet could be termed the first outlet, without changing the meaning of the description, so long as all occurrences of the "first outlet" are renamed consistently and all occurrences of the "second outlet" are renamed consistently. The first outlet and the second outlet are both outlets, but they are not the same outlet.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures, and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A metamaterial comprising:
    a first portion comprising a plurality of nanoparticles arranged in an array structure; and
    a second portion comprising a plurality of molecules configured to interlink with the plurality of nanoparticles, wherein each molecule in the plurality of molecules is formed by a chain of carbon atoms;
    wherein the first portion and the second portion of the metamaterial are configured to form a hybrid molecule-nanoparticle superlattice; and
    wherein the hybrid molecule-nanoparticle superlattice has a resonance frequency that is controlled by: (1) the mass of each nanoparticle in the first portion of the metamaterial and (2) a spring constant of each molecule in the second portion of the metamaterial, wherein the spring constant of each molecule in the second portion of the metamaterial is controlled by a total number of carbon-carbon bonds in the chain of carbon atoms.

2. The metamaterial of claim 1, wherein the first portion of the metamaterial is configured to have a mass configured to achieve, at least in part, the resonance frequency.

3. The metamaterial of claim 2, wherein the second portion of the metamaterial is configured to have a molecular stiffness configured to achieve, at least in part, the resonance frequency.

4. A metamaterial comprising:
    a first portion comprising a plurality of nanoparticles arranged in an array structure; and
    a second portion comprising a plurality of molecules configured to interlink with the plurality of nanoparticles, wherein each molecule in the plurality of molecules is formed by a chain of carbon atoms;
    wherein the first portion and the second portion of the metamaterial form a hybrid molecule-nanoparticle superlattice; and
    wherein the hybrid molecule-nanoparticle superlattice has a resonance frequency that is controlled by: (1) the mass of each nanoparticle in the first portion of the metamaterial, (2) a spring constant of each molecule in the second portion of the metamaterial, wherein the spring constant of each molecule in the second portion of the metamaterial is controlled by a total number of carbon-carbon bonds in the chain of carbon atoms, and (3) a crystal structure of the hybrid molecule-nanoparticle superlattice.

5. A metamaterial comprising:
    a first portion comprising a plurality of nanoparticles;
    a second portion comprising a plurality of molecules configured to interlink with the plurality of nanoparticles;
    wherein the first portion and the second portion of the metamaterial are configured to form a hybrid molecule-nanoparticle superlattice structure; and
    wherein a resonance frequency of the metamaterial is controlled by a total number of bonds within each molecule in the second portion of the metamaterial;
    a signal generator configured to provide a signal to the superlattice structure.

6. The metamaterial of claim 5, wherein the first portion of the metamaterial is configured to have a mass configured to achieve, at least in part, the resonance frequency.

7. The metamaterial of claim 6, wherein the second portion of the metamaterial is configured to have a molecular stiffness configured to achieve, at least in part, the resonance frequency.

8. The metamaterial of claim 5, wherein the signal generator is configured to generate radio frequency (RF) signals.

9. The metamaterial of claim 8, wherein the signal generator is an adjustable signal generator configured to adjust the RF signals provided to the first portion and the second portion of the metamaterial.

10. The metamaterial of claim 9, wherein the adjusting of the signal generator is configured to adjust a phononic response of the metamaterial.

11. The metamaterial of claim 9, wherein the adjusting of the signal generator is configured to adjust an electrical signal filtering property of the metamaterial.

\* \* \* \* \*